(12) United States Patent
Ishikawa et al.

(10) Patent No.: US 6,708,564 B2
(45) Date of Patent: Mar. 23, 2004

(54) ANGULAR VELOCITY MEASURING APPARATUS

(75) Inventors: Seiji Ishikawa, Nagoya (JP); Takayuki Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/954,713

(22) Filed: Sep. 18, 2001

(65) Prior Publication Data

US 2002/0046604 A1 Apr. 25, 2002

(30) Foreign Application Priority Data

Oct. 2, 2000 (JP) .................................... 2000-302025
Aug. 23, 2001 (JP) .................................... 2001-253279

(51) Int. Cl.$^7$ ............................................. G01P 1/02
(52) U.S. Cl. ...................................................... 73/493
(58) Field of Search ................... 73/493, 431, 504.12, 73/504.16, 504.15, 504.04, 504.02

(56) References Cited

U.S. PATENT DOCUMENTS

| | | | | |
|---|---|---|---|---|
| 5,581,032 A | * | 12/1996 | Uemura et al. | ............... 73/493 |
| 5,747,691 A | * | 5/1998 | Yoshino et al. | .......... 73/504.16 |
| 5,767,404 A | * | 6/1998 | Kaiser et al. | ................. 73/493 |
| 5,783,748 A | * | 7/1998 | Otani | ........................ 73/493 |
| 5,942,685 A | * | 8/1999 | Tabota | ....................... 73/493 |
| 6,094,984 A | * | 8/2000 | Asano et al. | .................. 73/493 |

FOREIGN PATENT DOCUMENTS

JP          2000-9476          1/2000

* cited by examiner

*Primary Examiner*—Helen Kwok
(74) *Attorney, Agent, or Firm*—Burr & Brown

(57) ABSTRACT

An angular velocity measuring apparatus for detecting an angular velocity of a rotation about a rotation axis including a vibration element, a semiconductor integrated circuit chip for processing signals supplied to and from the vibration element and a circuit board on which the semiconductor integrated circuit chip is mounted, and the vibration element is mounted on the semiconductor integrated circuit chip by means of a supporting member including a metal support rod and an adhesive layer. The vibration element and semiconductor integrated circuit chip are arranged to be overlapped with each other viewed in a direction of the rotation axis and are arranged substantially in parallel with each other in planes which are substantially perpendicular to the rotation axis.

18 Claims, 10 Drawing Sheets

ANGULAR VELOCITY MEASURING APPARATUS

BACKGROUND OF THE INVENTION

1. Field of the Invention

The present invention relates to an angular velocity measuring apparatus including a vibration type gyroscope.

2. Related Art Statement

Recently, in a vehicle control system utilizing a body rotation speed feedback system, a vibration type gyroscope has been proposed to be used as a rotation speed sensor. The vibration type gyroscope is an angular velocity sensor utilizing a coriolis force which is produced by a rotation of a vibrating element. The vibrating element is vibrated electrically by supplying a driving signal thereto, and at the same time, a vibration induced by a coriolis force is detected to measure an angular velocity of the rotational movement. In such a system, a direction in which driving wheels are directed is detected by a rotation angle of a steering wheel. At the same time, an actual rotation speed of a vehicle body is detected by the vibration type gyroscope. Then, the driving direction denoted by the steering wheel is compared with the direction obtained from the actual rotation speed to derive a difference, and wheel torque and driving angle are corrected in accordance with the thus detected difference to control the vehicle body stably.

In the vibration type gyroscope, the vibrating element is installed within a package or vessel such as can-package. The can-package is installed within a housing together with a necessary circuit, and the housing is provided on the vehicle body. In this case, after securing a vibration element and a semiconductor integrated circuit chip to a supporting substrate, the substrate is secured to a base of the can-package by means of conductor pins.

For instant, in Japanese Patent Application Laid-open Publication Kokai 2000-9476, a vibration element of tuning fork type is fixed on a supporting substrate and the supporting substrate is installed within a package together with a swing-protection member which serves to prevent undesired swinging movement of the vibration element when unintentional vibration or impact is applied to the vibration element. In this manner, the vibration element can be protected against damage.

Since a space in which the vibration type gyroscopes is arranged in a vehicle is limited, it is required to reduce a surface area of the package as well as a height of the package. However, there has not been developed sufficiently effective measure for miniaturizing the package without affecting a performance of the gyroscope.

SUMMARY OF THE INVENTION

The present invention has for its object to provide an angular velocity measuring apparatus utilizing a vibration type gyroscope including a vibration element and a supporting substrate installed within a package, in which a size of the package can be miniaturized without affecting a performance of the vibration type gyroscope.

According to a first aspect of the invention, an angular velocity measuring apparatus for detecting a rotational angular velocity about a rotation axis includes:

a vibration element;

a vibration element supporting member for supporting the vibration element;

a circuit board for supporting the vibration element by means of the supporting member; and a semiconductor integrated circuit chip for controlling signals for the vibration element.

The semiconductor integrated circuit chip is mounted on the circuit board by flip-chip bonding, and the vibration element is mounted on the semiconductor integrated circuit chip by means of the supporting member.

Upon manufacturing the angular velocity measuring apparatus having the above mentioned unique structure, after mounting the semiconductor integrated circuit onto the circuit board by means of the flip chip bonding, the vibration element is mounted on a flat top surface of the semiconductor integrated circuit chip by means of the supporting member. Then, a size of the angular velocity measuring apparatus can be reduced greatly without affecting the vibration element, driving system for the vibration element and a signal processing system for processing the signals supplied to and from the vibration element.

In a preferable embodiment of the angular velocity measuring apparatus according to the first aspect of the present invention, the vibration element is arranged to extend on a given plane substantially perpendicular to a rotation axis of the vibration element.

The arrangement of the vibration element along the given plane does not strictly mean that the vibration element is formed to extend on a single surface, because the vibration element has a finite thickness. Usually the vibration element may be provided within a space having a height of about 1 mm on the given plane.

Furthermore, it is not always necessary that said given plane is set to be completely perpendicular to the rotation axis and may be inclined with respect to a plane perpendicular to the rotation axis due to a tolerance. Usually, said given plane may be inclined with respect to the real perpendicular plane by an angle not larger than 5°. Such a vibration element is generally called a laterally placed vibration element. The present invention can provide a remarkable improvement in reducing a size of the package for such a laterally placed vibration element.

In a preferable embodiment of the angular velocity measuring apparatus according to the first aspect of the invention, the semiconductor integrated circuit chip is arranged to extend substantially in parallel with the vibration element. In this case, the vibration element and semiconductor integrated circuit chip are preferably overlapped with each other viewed in a direction of the rotation axis. Then, a height and a lateral dimension of the can-package can be effectively reduced.

According to the invention, any kind of the semiconductor integrated circuit chip for controlling a driving signal supplied to the vibration element and a detection signal generated from the vibration element may be used. Particularly, it is preferable to use ASIC (Application Specified Integrated Circuit).

When the semiconductor integrated circuit chip is mounted on the circuit board by the flip chip bonding and the vibration element is mounted on the semiconductor integrated circuit chip by means of the supporting member, the thus assembled vibration element, supporting member, circuit board and semiconductor integrated circuit chip may be accommodated within a can-package.

According to a second aspect of the invention, an angular velocity measuring apparatus for detecting a rotational angular velocity about a given rotation axis includes:

a vibration element;

a vibration element supporting member for supporting the vibration element;

a semiconductor integrated circuit chip for controlling signals for the vibration element;

a ceramic circuit board for supporting the vibration element by means of the supporting member; and a lid hermetically secured to the ceramic circuit board to constitute a space;

wherein at least the vibration element and vibration element supporting member are installed within the space.

In this manner, when the vibration element is mounted on the ceramic circuit board by means of the vibration element supporting member, a standoff from a mother board which is required in the known can-package can be dispensed with, and therefore a height of the package after installing the vibration element can be further reduced. Furthermore, in the can-package, conductor pins have to be inserted into through-holes formed in a base of the can-package and then the conductor pins have to be soldered to the circuit board. In case of using the ceramic circuit board according to the second aspect of the present invention, it is no more necessary to use the conductor pins, and the semiconductor integrated circuit chip can be connected to an external circuit by soldering conductors to contact lands provided on a rear surface of the ceramic circuit board. Therefore, undesired damage and breakage of conductor pins can be avoided. When impact is applied to the package from the external, the conductor pins might be twisted and an error signal might be generated. According to the second aspect of the invention, the generation of such an error signal can be also suppressed.

According to a third aspect of the invention, an angular velocity measuring apparatus for detecting a rotational angular velocity about a given rotation axis includes:

a vibration element;

a vibration element supporting member for supporting the vibration element;

a circuit board for supporting the vibration element by means of the supporting member;

a semiconductor integrated circuit chip for controlling signals for the vibration element;

a can-package having a can-package base and a can-package lid hermetically welded to the can-package base to constitute a space; and a plurality of conductor pins extending into the space through the can-package base and electrically connected to the circuit board;

wherein the vibration element is mounted on one surface of the circuit board by means of the vibration element supporting member, the semiconductor integrated circuit chip is mounted on the other surface of the circuit board by bare-die-bonding and is connected to the circuit board by bonding wires, the circuit board and the conductor pins secured to the can-package base are fixed by a silver paste.

Since the semiconductor integrated circuit chip is mounted on the rear surface of the circuit board by means of the bare-die-bonding and is connected to the circuit board by bonding wires, the potting process for protecting the semiconductor integrated circuit chip and bonding wires is no more necessary. Furthermore, since the semiconductor integrated circuit chip is provided between the circuit board and the base of the can-package, the semiconductor integrated circuit chip can be effectively prevented from being damaged by unintentional impact during a manufacturing process prior to welding the lid to the can-package in an air-tight manner. Moreover, since the circuit board is connected to the conductor pins by means of the silver paste, a washing process which is required in the case of soldering may be dispensed with.

DETAILED DESCRIPTION OF THE INVENTION

Several embodiments of the angular velocity measuring apparatus according to the invention will be explained with reference to the accompanying drawings.

Figure 1:
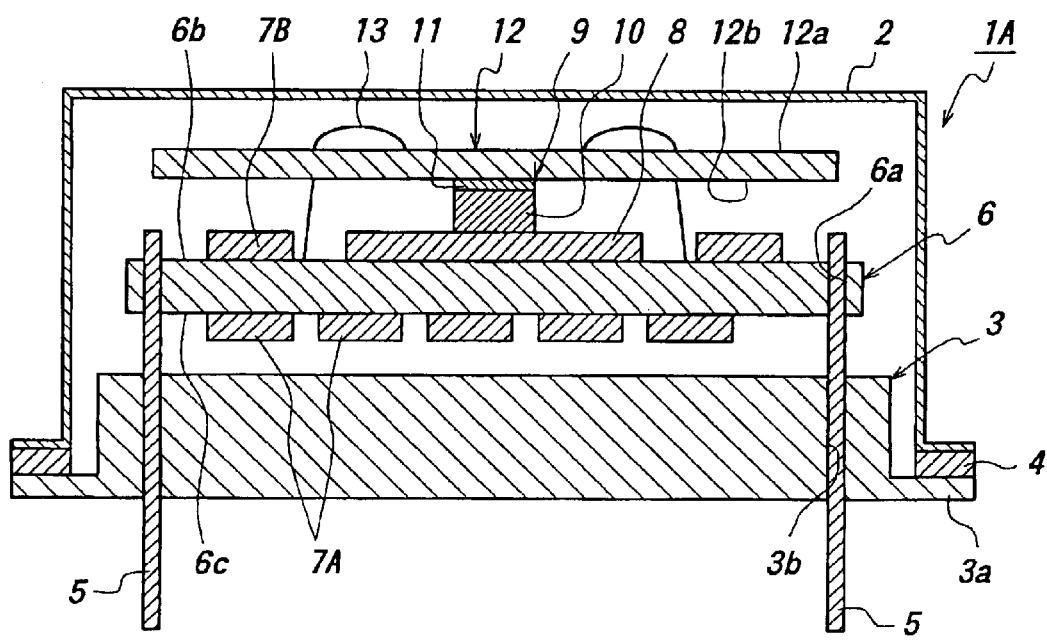
FIG. 1 is a cross sectional view showing schematically an embodiment of the angular velocity measuring apparatus according to the first aspect of the invention.
Figure 1:
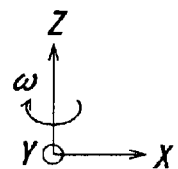

FIG. 1 is a cross sectional view showing an embodiment of the angular velocity measuring apparatus according to the first aspect of the invention. Upon manufacturing the angular velocity apparatus 1A, at first, chip components 7B are mounted on a surface 6b of a circuit board 6, and further a semiconductor integrated circuit chip 8 is mounted on the surface 6b of the circuit board 6 at a central portion thereof by means of the flip-chip bonding. Chip components 7A are mounted on surface 6c of circuit board 6. The flip-chip bonding is a well known bonding technique, in which the semiconductor integrated circuit chip 8 is first placed on the surface of the circuit board 6 and then a space between the chip 8 and circuit board surface is filled with plastics.

Next, the circuit board 6 is supported by a can-package base 3. That is to say, conductor pins 5 are inserted into through-holes 3b formed in the can-package base 3 and then are inserted into through-holes 6a formed in the circuit board 6. Next, the conductor pins 5 are secured to the circuit board 6 by soldering.

Then, a vibration element 12 is provided on a flat top surface of the semiconductor integrated circuit chip 8 by means of a supporting member 9. The supporting member 9 includes a support rod 10 made of a metal and cemented onto the top surface of the chip 8, and an adhesive layer 11 by means of which the support rod 10 is cemented onto a rear surface 12b of the vibration element 12 by means of an adhesive. One end of each of wires 13 is connected to a front surface 12a of the vibration element 12 and the other end of each of wires 13 is connected to a front surface 6a of the circuit board 6. Finally, a lid 2 is secured to a flange 3a of the can-package base 3 by resistance welding. In FIG. 1, a welded portion is denoted by a reference numeral 4.

In the present embodiment, the vibration element 12 extends substantially in parallel with an X-Y plane, and a rotation axis of the vibration element extends in a Z direction which is perpendicular to the X-Y plane. An angular velocity of a rotational movement ($\omega$ about the rotation axis extending in the Z direction is detected.

FIG. 2 is a cross sectional view illustrating a package used in an embodiment of the angular velocity measuring apparatus according to the second aspect of the invention. A package 15 includes a ceramic circuit board 18A, and a vibration element 12 is provided on an inner surface 18e of a flat plate portion 18c of the ceramic circuit board 18A by means of a supporting member 9. An outer surface 18d of the flat plate portion 18c is formed flat. The ceramic circuit board 18A further includes a side wall portion 18b formed along a periphery of the flat plate portion 18c. An opening defined by the side wall portion 18b is covered with a lid 16 to constitute the package 15. The vibration element 12 and supporting member 9 are installed within an inner space 17 of the package 15. An inner surface 18e of the flat plate portion 18c of the ceramic circuit board 18A facing the vibration element 12 includes step portions 18a which extend from the periphery of the flat plate portion 18c. One end of each of the bonding wires 13 is connected to the front surface 12a of the vibration element 12 and the other end of each of the bonding wires 13 is connected to contact lands provided on the step portions 18a.

As explained above, in the present embodiment, the ceramic circuit board 18A has the step portions 18a formed in the inner surface of the ceramic circuit board 18A to protrude toward the vibration element 12 and the bonding wires are connected to the lands provided on top surfaces of the step portions 18a, whose level is higher than the inner surface 18e of the flat plate portion 18c, and therefore a difference in the levels of the ends of the bonding wires 13 can be reduced. This results in a height of the package 15 being reduced. Moreover, a length of the bonding wires 13 can be also reduced.

Figure 2A:
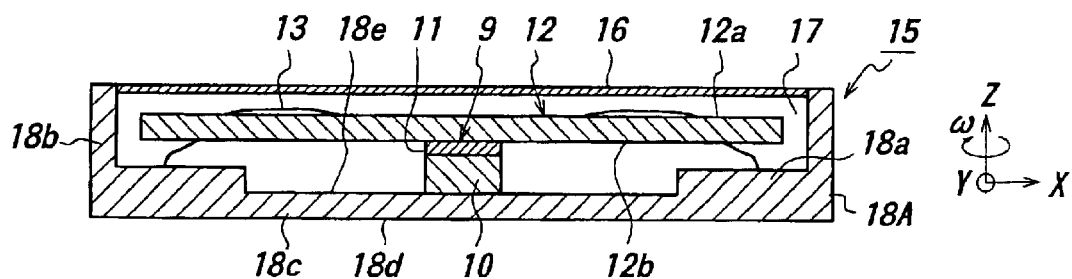
FIGS. 2A and 2B are plan and cross sectional views illustrating an embodiment of the angular velocity measuring apparatus according to the second aspect of the invention.
Figure 2B:
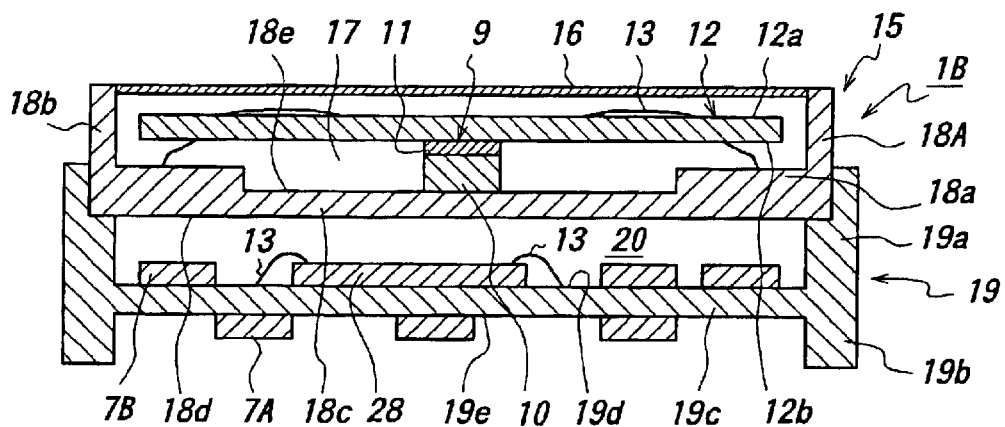

FIG. 2B shows an embodiment of the angular velocity measuring apparatus using the package 15 shown in FIG. 2A. In the present embodiment, the package 15 in which the vibration element 12 and supporting member 9 are installed is coupled with a fitting member 19 such that a space 20 is formed between the package and the fitting member, and a semiconductor integrated circuit chip 28 is installed within this space.

The fitting member 19 formed by a ceramic circuit board includes a circuit portion 19c. On an outer surface 19e of the circuit portion 19c of the fitting member 19 are provided chip components 7A, and on an inner surface 19d of the circuit portion 19c are arranged chip components 7B and the semiconductor integrated circuit chip 28. The semiconductor integrated circuit chip 28 is mounted on the inner surface 19d of the circuit portion 19c of the fitting member 19 by means of the flip-chip bonding. The semiconductor integrated circuit chip 28 is connected to contact lands of the circuit portion 19c by means of bonding wires 13. The fitting member 19 further comprises peripheral side wall portions 19a and 19b, and the package 15 is secured to the peripheral side wall portion 19a to form the space 20. As stated above, the semiconductor integrated circuit chip 28 is arranged within this space 20. It should be noted that the ceramic circuit board 18A is also electrically connected to the fitting member 19 by means of electrodes provided on the surface 18d of the flat plate portion 18c of the ceramic circuit board 18A and via-holes embedded in the side wall portion 19a.

In the present embodiment, a part of the ceramic circuit board on which the semiconductor integrated circuit chip 28 is mounted and a part of the ceramic circuit board supporting the vibration element 12 are separated from each other, and therefore a limitation in designing the circuit structure can be mitigated.

In the present embodiment, the semiconductor integrated circuit chip 28 is overlapped with the vibration element 12 viewed in the Z direction. Therefore, a lateral size of the whole package can be reduced. In the present embodiment, the semiconductor integrated circuit chip 28 is secured to the circuit portion 19c of the fitting member 19 by the flip chip bonding, but it may be fixed by any other bonding method.

Figure 3:
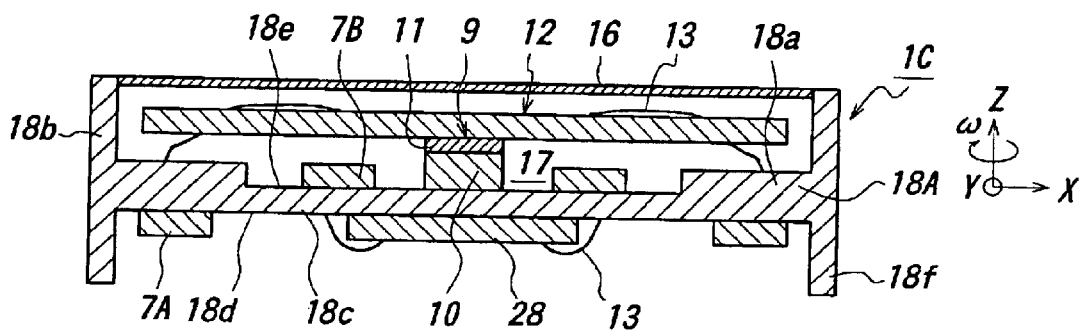
FIG. 3 is a cross sectional view depicting another embodiment of the angular velocity measuring apparatus according to the second aspect of the invention.

In an embodiment of the angular velocity measuring apparatus 1C shown in FIG. 3, a semiconductor integrated circuit chip 28 is provided on a surface 18d of a flat plate portion 18c of a ceramic circuit board 18A, said surface being opposite to a lid 16. Chip components 7A and 7B are secured to the either surfaces 18d and 18e of the flat plate portion 18c. Then, a height of the whole package can be further reduced. As shown in FIG. 3, the ceramic circuit board 18A further includes a peripheral side wall 18f extending from the periphery of the flat plate portion 18c in a direction opposite to the lid 16. Also in this embodiment, the semiconductor integrated circuit chip 28 is fixed to the surface 18d of the flat plate portion 18c by the flip-chip bonding, but it may be secured by any other bonding method.

Figure 4:
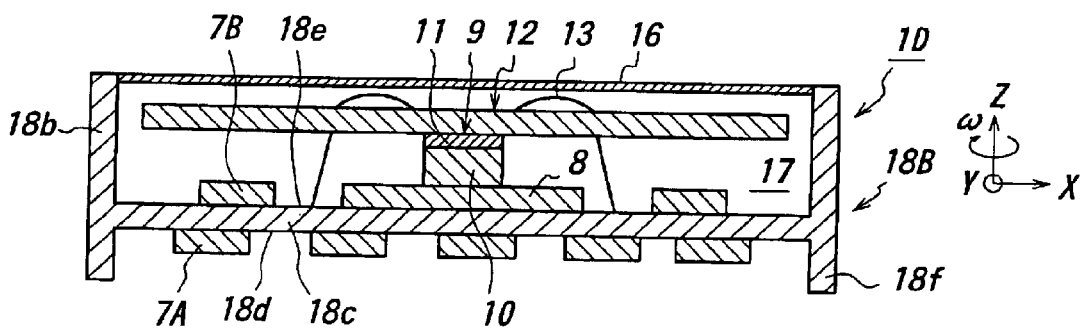
FIG. 4 is a cross sectional view showing another embodiment of the angular velocity measuring apparatus according to the first aspect of the invention.

FIG. 4 is a cross sectional view depicting another embodiment of the angular velocity measuring apparatus 1D according to the first aspect of the invention. A semiconductor integrated circuit chip 8 is fixed by the flip-chip bonding onto a surface 18e of a flat plate portion 18c of a fitting member constituting a ceramic circuit board 18B, and a vibration element 12 is provided on a flat top surface of the semiconductor integrated circuit chip 8 by means of a supporting member 9. That is to say, the semiconductor integrated circuit chip 8 and vibration element 12 are installed within a space 17 formed by the ceramic circuit board 18B and a lid 16 hermetically secured to an opening of the ceramic circuit board 18B.

In the present embodiment, like as the previous embodiment shown in FIG. 1, a height of the whole package can be reduced and a surface area of the flat plate portion 18c can be decreased.

Figure 5:
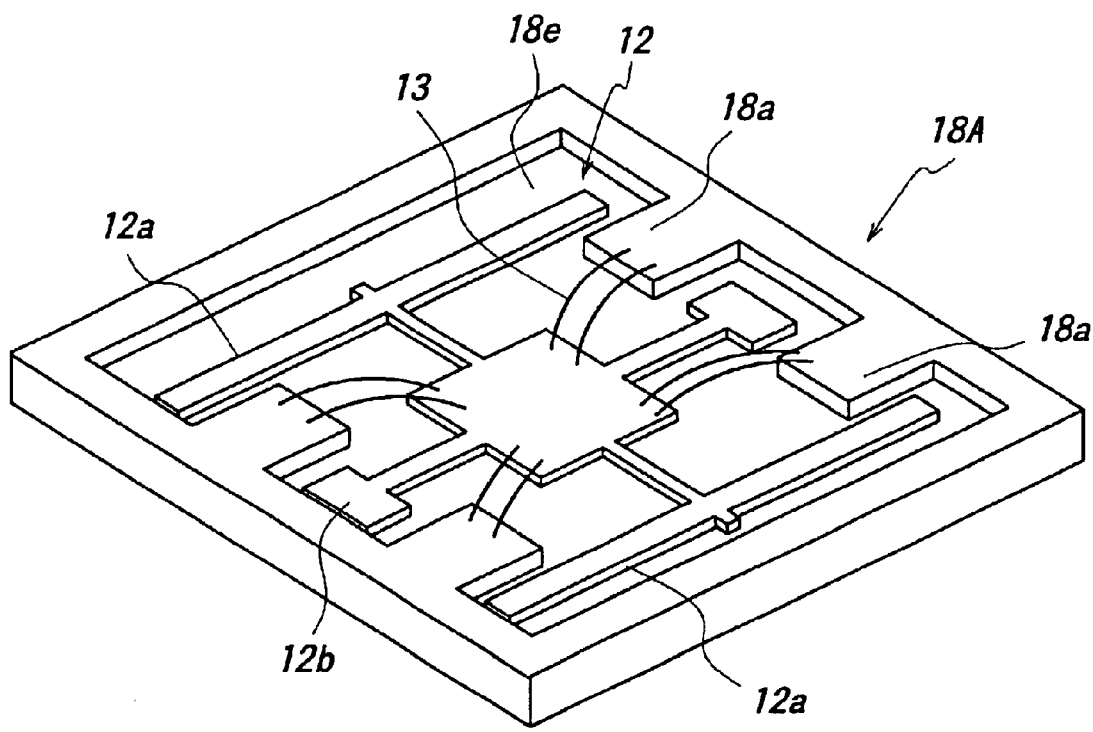
FIGS. 5–10 are perspective views illustrating several embodiments of the ceramic circuit board used in the embodiments according to the invention.
Figure 6:
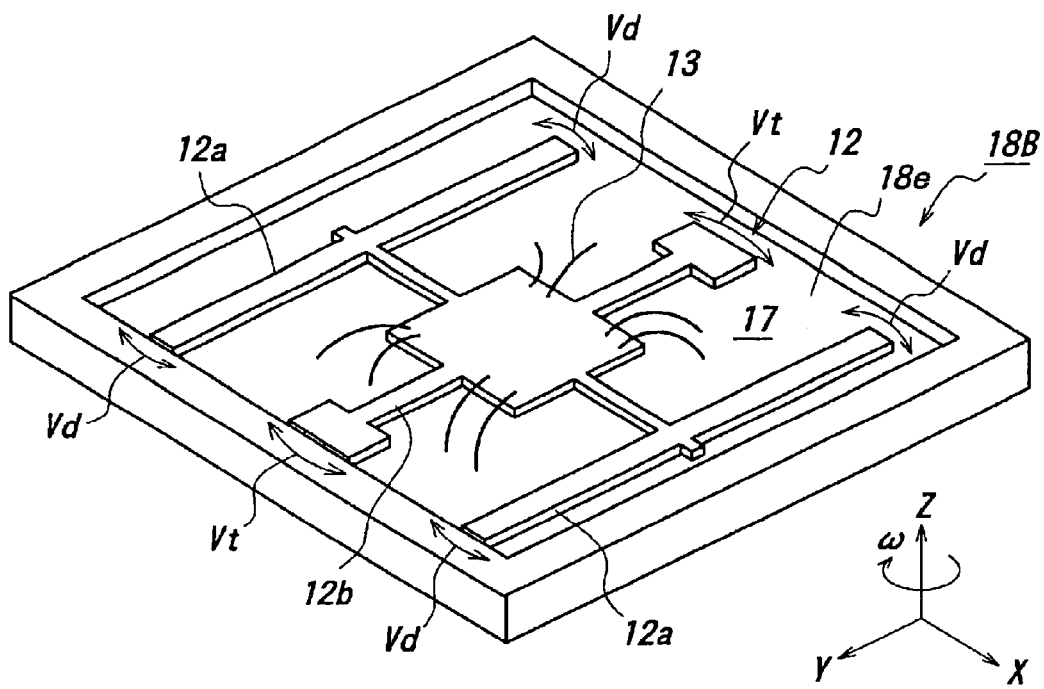

FIGS. 5–10 are perspective views illustrating several embodiments of the ceramic circuit board with the lid 16 being removed. FIG. 5 shows the ceramic circuit board 18A used in the embodiment shown in FIG. 2. In this embodiment, there are formed four step portions 18a at respective corners. FIG. 6 depicts the ceramic circuit board 18B used in the embodiment illustrated in FIG. 4. In this case, there is not provided a step portion. Furthermore, it is preferable that a driving vibration mode Vd of the vibration element and a detecting vibration mode Vt are in substantially the same plane.

Figure 7:
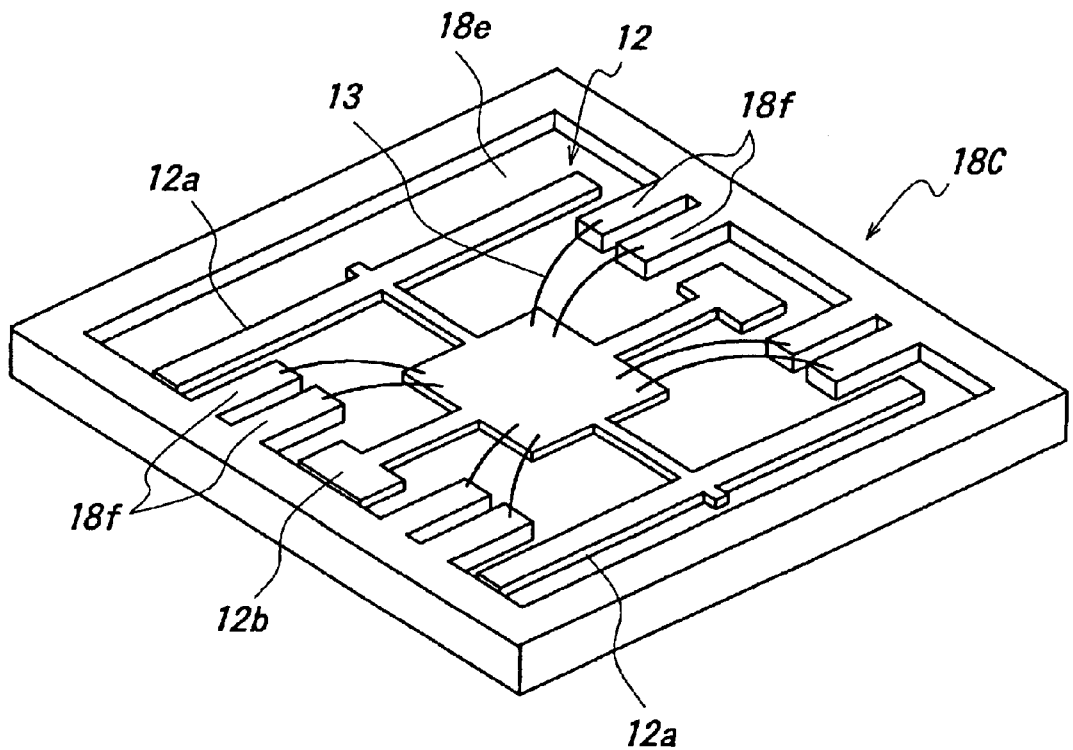

In a ceramic circuit board 18C depicted in FIG. 7, there are formed eight step portions 18f. Such step portions 18f may be obtained by dividing each of the four step portions 18a shown in FIG. 5 into two narrow step portions.

Figure 8:
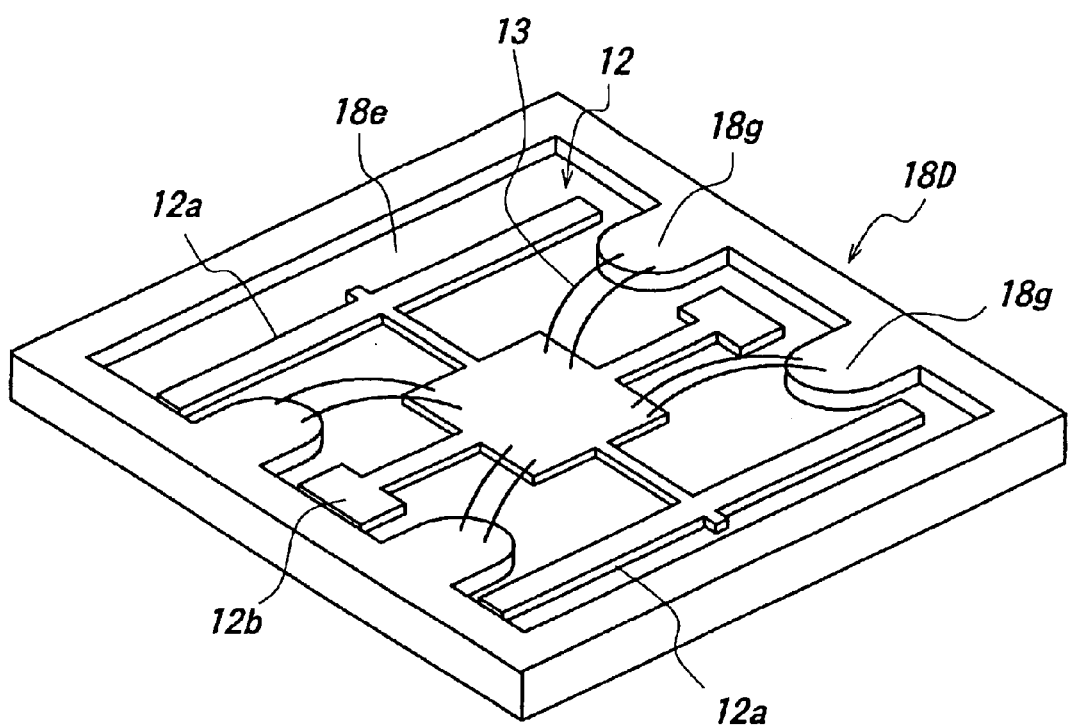
Figure 9:
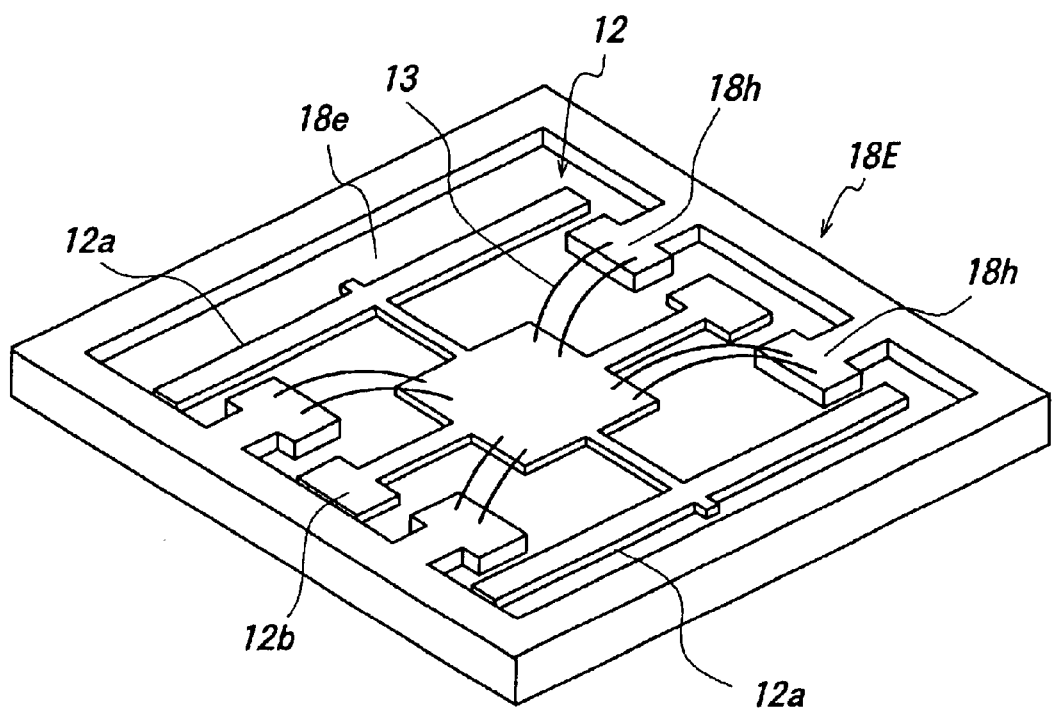
Figure 10:
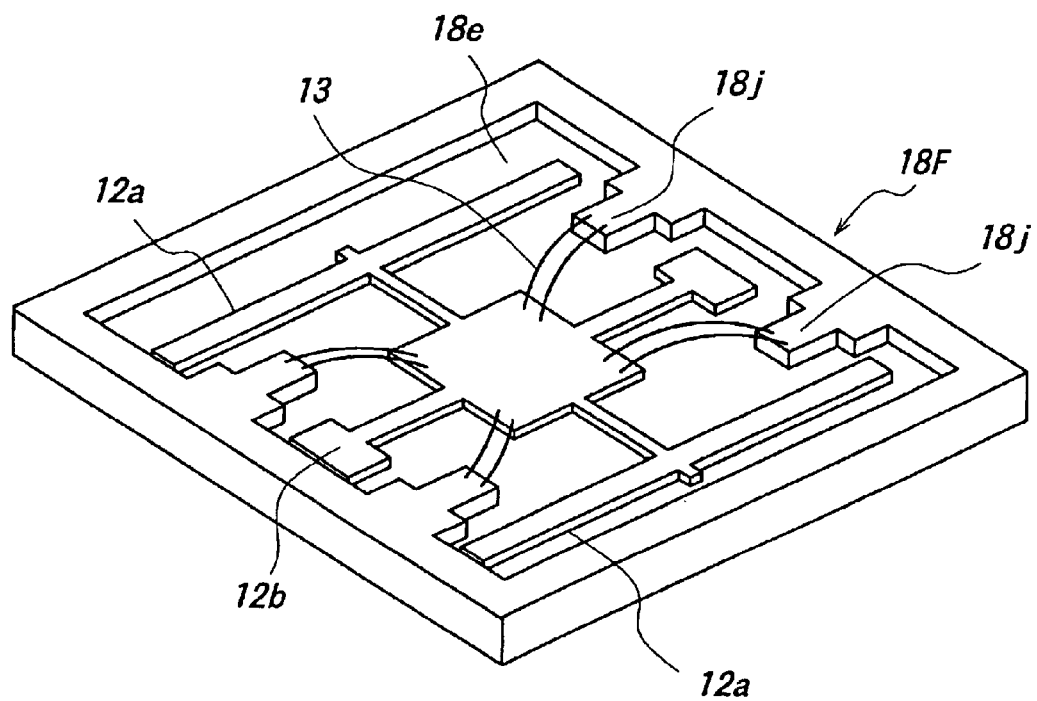

In a ceramic circuit board 18D shown in FIG. 8, semi-circular step portions 18g are provided, and in a ceramic circuit board 18E illustrated in FIG. 9, there are formed rectangular step portions 18h each having an enlarged tip portion. In a ceramic circuit board 18F shown in FIG. 10, there are provided four rectangular step portions 18j each including a narrowed tip.

Figure 11:
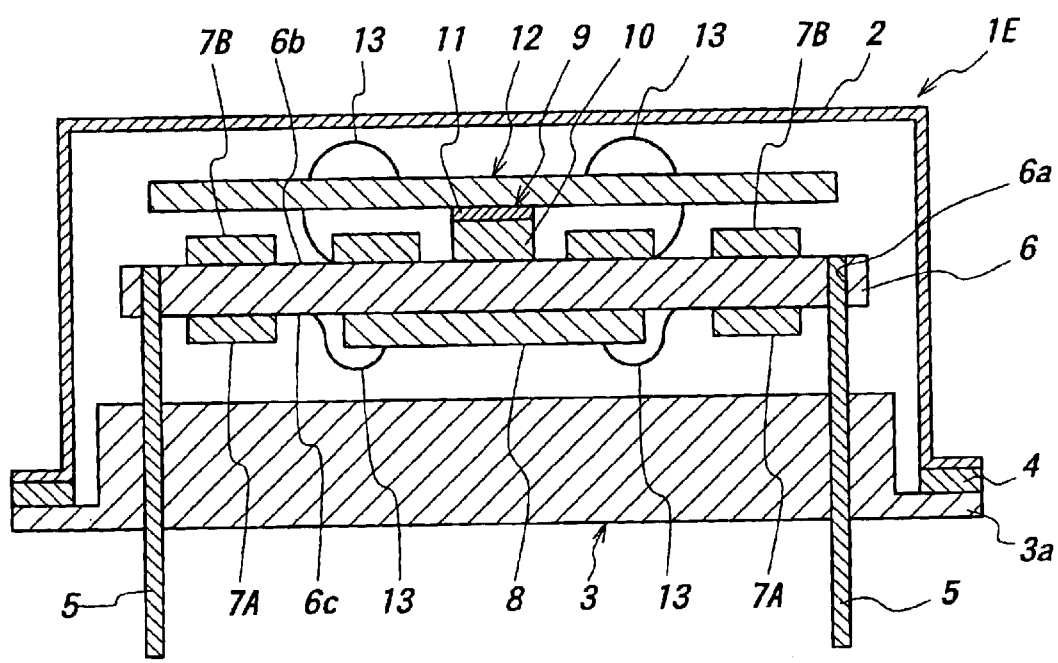
FIG. 11 is a cross sectional view representing an embodiment of the angular velocity measuring apparatus according to the third aspect of the invention.

FIG. 11 is a cross sectional view showing an embodiment of the angular velocity measuring apparatus according to the third aspect of the invention. Upon manufacturing the apparatus 1E of the present embodiment, at first, chip components 7B are secured to a front surface 6b of a circuit board 6 and chip components 7A are provided on a rear surface 6c of the circuit board 6. A semiconductor integrated circuit chip 8 is secured to the surface 6c of the circuit board 6 by means of the bare die-bonding, and wires 13 are provided by the wire bonding. In the embodiment shown in FIG. 1, the front surface of the semiconductor integrated circuit chip 8 is brought into contact with the surface of the circuit board 6, and then the potting is performed to cover an exposed rear surface of the semiconductor chip 8 with plastics. However, in the present embodiment, such a potting treatment is dispensed with.

Next, conductor pins 5 secured to a can-package base 3 are inserted into through holes 6a formed in the circuit board 6 and the conductor pins 5 are connected to the circuit board 6 by means of a silver paste. By connecting the conductor pins 5 and circuit board 6 with a silver paste instead of soldering, a washing process can be dispensed with. In this manner, in the present embodiment, since the potting process as well as the washing process are dispensed with, throughput can be improved.

Next, a vibration element 12 is secured to the front surface 6b of the circuit board 6 at a central portion of the circuit board by means of a supporting member 9 including a metal support rod 10 and an adhesive layer 11. The vibration element 12 is connected by bonding wires 13 to the circuit board 6. Finally, a lid 2 of the can-package is secured to a flange 3a of the can-package base 3 with the resistance welding. A welding portion is denoted by a reference numeral 4 in FIG. 11.

In this manner, the semiconductor integrated circuit chip 8 and vibration element 12 are arranged to be overlapped with each other, and thus a lateral dimension of the angular velocity measuring apparatus 1E can be reduced like as the previous embodiments. Moreover, as compared with the embodiment illustrated in FIG. 1, the space between the circuit board 6 and the can-package base 3 is utilized effectively, and therefore a height of the angular velocity measuring apparatus 1E can be further reduced.

The present invention is not limited to the embodiments explained so far, but many alternations and modifications within the scope of the claims may be conceived by a person skilled in the art. For instance, instead of the can-package, use may be made of a vessel consisting of a flat glass epoxy substrate and a box-like member formed by folding a metal plate and secured to the glass epoxy substrate by soldering. A means for driving the vibration element and a means for detecting a detection signal from the vibration element may be any conventional means widely used in the vibration type gyroscopes. When the vibration element is made of a piezoelectric material, driving electrodes and detection electrodes are provided on the element. As a piezoelectric material, not only a piezoelectric single crystal, but also piezoelectric ceramics such as PZT may be used. When the vibration element is made of an identity elastic metal or alloy, driving electrodes and detection electrodes made of piezoelectric ceramics may be applied on the element.

It should be noted that the vibration element may be supported by any suitable method such as cementing with adhesive agent or viscoelastic agent, mechanical fixing with clamps, welding, and solid-phase diffusion. It is preferable to secure the vibration element with the aid of adhesive agent in order to attain a high detection sensitivity.

The adhesive layer 11 for cementing the support rod 10 of the vibration element supporting member 9 to the vibration element 12 may be made of any adhesive material selected from a synthetic rubber adhesive agent such as silicone adhesive agent and urethane rubber adhesive agent and a synthetic resin adhesive agent such as epoxy adhesive agent and polyimide adhesive agent. In this case, it is preferable that a dynamic modulus of elasticity of the adhesive agent is not larger than one hundredth of that of the vibration element. Then, the adhesive agent could not affect the vibrating condition. Practically, when the vibration element is made of piezoelectric single crystal or piezoelectric ceramics or identity elastic metal, a dynamic modulus of elasticity of the adhesive agent is preferably $10^6$–$10^8$Pa.

In order to fix the vibration element firmly, the adhesive layer 11 preferably has a thickness not larger than 1 mm, particularly not larger than 0.4 mm. On the other hand, in order to suppress a change in Q value of the vibration of the vibration element over an operation temperature range and to increase a detection sensitivity of the vibration, it is preferable that a thickness of the adhesive layer 11 is not smaller than 0.05 mm, particularly not smaller than 0.1 mm.

In order to make the Q value of the vibration over an operation temperature range (usually $-30°$ C.–+85° C., particularly $-40°$ C.–+85° C.) larger and constant, tan δ of the adhesive layer 11 is preferably not larger than 0.05. An upper limit of tan δ of the adhesive layer 11 is not set and may be zero. Within the operation temperature range, a ratio of a maximum value of tan δ of the adhesive layer 11 with respect to a minimum value is preferably not larger than 3. In order to make Q value of the vibration constant, a specific gravity of the adhesive layer 11 is preferably not larger than 1.1. To this end, an amount of filler contained in the adhesive layer may be not larger than 7 weight %.

According to the invention, a temperature of the vibration element can be controlled by utilizing heat generated by the semiconductor integrated circuit chip. When an ambient temperature changes over a wide range such as $-40°$ C.–+85° C., an ambient temperature of the vibration element can be preferably adjusted within a smaller temperature range such as 0° C.–+85° C., particularly +25° C.–+85° C. by utilizing the heat generated by the semiconductor integrated circuit chip. Furthermore, by using Peltier element in combination with the heat generated by the semiconductor integrated element, an ambient temperature of the vibration element can be controlled to a constant temperature within a range of 0° C.–+85° C., particularly +25° C.–+85° C. or can be maintained at a constant temperature not higher than +45° C.

As explained above in detail, in the angular velocity measuring apparatus according to the invention, a package accommodating the vibration element, circuit board and semiconductor integrated circuit chip can be minimized.

What is claimed is:

1. An angular velocity measuring apparatus for detecting an angular velocity of a rotation about a rotation axis, comprising:

a vibration element;

a vibration element supporting member for supporting said vibration element;

a circuit board for supporting said vibration element by means of said supporting member; and a semiconductor integrated circuit chip for controlling signals for the vibration elements;

wherein said semiconductor integrated circuit chip is mounted on said circuit board by flip-chip bonding, and said vibration element is mounted on said semiconductor integrated circuit chip by means of said supporting member, and said vibration element and said semiconductor integrated circuit chip are arranged to be overlapped with each other viewed in a direction in which said rotation axis extends.

2. The angular velocity measuring apparatus according to claim 1, wherein said vibration element is arranged in a plane which is substantially perpendicular to said rotation axis.

3. The angular velocity measuring apparatus according to claim 2, wherein said semiconductor integrated circuit chip is arranged substantially in parallel with said vibration element.

4. The angular velocity measuring apparatus according to claim 3, wherein said apparatus further comprises a can-package having a can-package base and a lid hermetically secured to the can-package base along a peripheral portion thereof to constitute a space, said vibration element, said supporting member, said circuit board and said semiconductor integrated circuit chip are installed within said space, and said circuit board is connected to conductor pins which extend into sida space via through-holes formed in said can-package base.

5. The angular velocity measureing apparatus according to claim 3, wherein said circuit board is formed by a ceramic circuit board having a base portion and a side wall portion defining an opening, and said apparatus further comprises a lid hermetically secured to said side wall portion of the ceramic circuit board to close said opening and to constitute a space, and said vibration element, said supporting member and said semiconductor integrated circuit chip are installed within said space.

6. The angular velocity measuring apparatus according to claim 5, wherein said ceramic circuit board includes step portions formed on a surface of said base portion on which said semiconductor integrated circuit chip is mounted, and said vibration element is connected by bonding wires to said ceramic circuit board at said step portions.

7. An angular velocity measuring apparatus for detecting a rotational angular velocity about a given rotation axis, comprising:

a vibration element;

a vibration element supporting member for supporting said vibration element;

a semiconductor integrated circuit chip for controlling signals for the vibration element;

a ceramic circuit board for supporting said vibration element by means of said supporting members; and a lid hermetically secured to said ceramic circuit board to constitute a space, wherein at least said vibration element and said vibration element supporting member are installed within said space, and said vibration element and said semiconductor integrated circuit chip are arranged to be overlapped with each other viewed in a direction in which said rotation axis extends.

8. The angular velocity measuring apparatus according to claim 7, wherein said vibration element is arranged in a plane which is substantially perpendicular to said rotation axis.

9. The angular velocity measuring apparatus according to claim 8, wherein said semiconductor integrated circuit chip is arranged substantially in parallel with said vibration element.

10. The angular velocity measuring apparatus according to claim 9, wherein said semiconductor integrated circuit chip mounted by flip-chip bonding on a surface of said ceramic circuit board defining said space, and said vibration element is mounted on said semiconductor integrated circuit chip by means of said supporting member.

11. The angular velocity measuring apparatus according to claim 9, wherein said semiconductor integrated circuit chip is mounted on a surface of said ceramic circuit board, said surface being opposite to a surface of the ceramic circuit board defining said space.

12. The angular velocity measuring apparatus according to claim 9, wherein said apparatus further comprises a fitting member having a base portion and a side wall portion formed along a periphery of said base portion, said semiconductor integrated circuit chip is mounted on said base portion of the fitting member, and said ceramic circuit board is hermetically secured to said side wall portion of said fitting member to constitute a space within which said semiconductor integrated circuit chip is installed.

13. The angular velocity measuring apparatus according to claim 12, wherein said fitting member is formed by a ceramic circuit board.

14. The angular velocity measuring apparatus according to claim 7, wherein said ceramic circuit board includes step portions formed in a surface facing said vibration element to protrude toward the vibration element, and said vibration element is connected to said step portions of said ceramic circuit board by means of bonding wires.

15. An angular velocity measuring apparatus for detecting a rotational angular velocity about a given rotation axis, comprising:

a vibration element;

a vibration element supporting member for supporting said vibration element;

a circuit board for supporting said vibration element by means of said supporting member;

a semiconductor integrated circuit chip for controlling signals for the vibration element;

a can-package having a can-package base and a can-package lid hermetically welded to the can-package base to constitute a space; and a plurality of conductor pins extending into said space through said can-package base and electrically connected to said circuit board, wherein said vibration element is mounted on one surface of said circuit board by means of said vibration element supporting member, said semiconductor integrated circuit chip is mounted on the other surface of the circuit board by bare-die-bonding and connected to the circuit board by bonding wires, said circuit board and said conductor pins secured to the can-package base are fixed by a silver paste, and said vibration element and said semiconductor integrated circuit chip are arranged to be overlapped with each other viewed in a direction in which said rotation axis extends.

16. The angular velocity measuring apparatus according to claim 15, wherein said vibration element is arranged in a plane which is substantially perpendicular to said rotation axis.

17. The angular velocity measuring apparatus according to claim 16, wherein said semiconductor integrated circuit chip is arranged substantially in parallel with said vibration element.

18. The angular velocity measuring apparatus according to claim 2, wherein an ambient temperature of said vibration element is controlled by utilizing a heat generated by said semiconductor integrated circuit chip.

* * * * *